March 25, 1952  H. W. CURRIE  2,590,381
CANDY CLEANING MACHINE
Filed Nov. 5, 1949  3 Sheets-Sheet 3
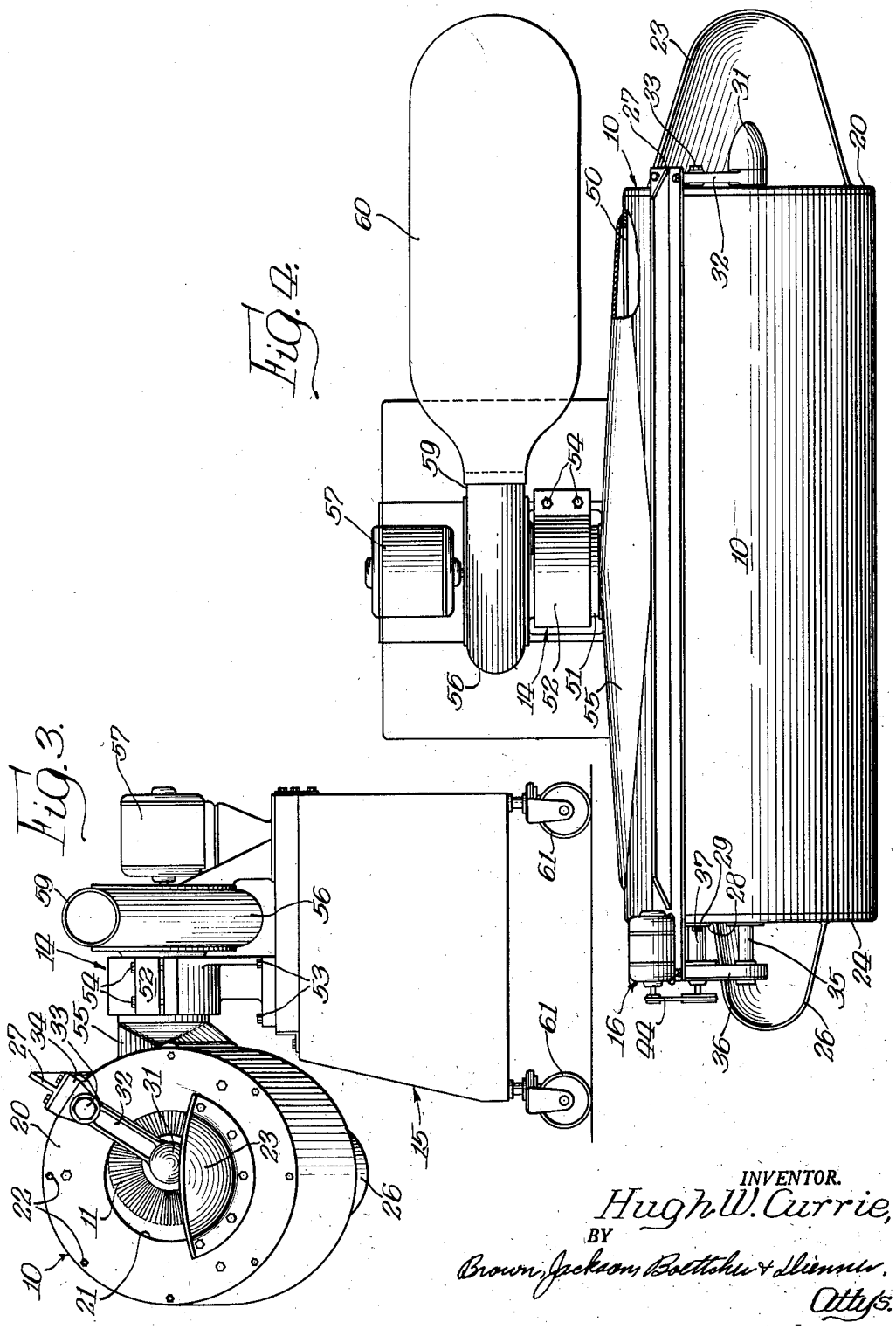
INVENTOR.
Hugh W. Currie,
BY
Brown, Jackson, Boettcher & Dienner.
Attys.

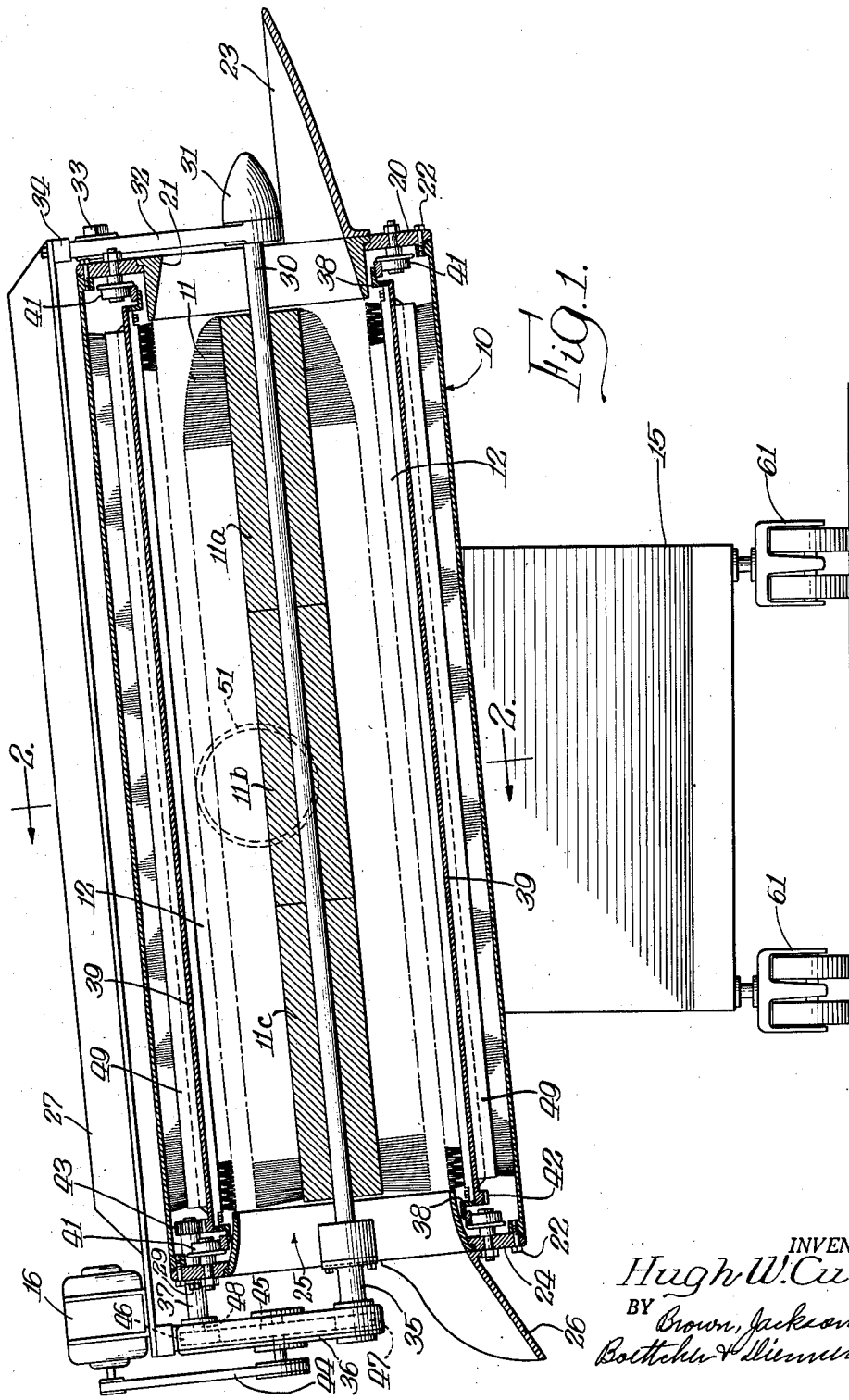

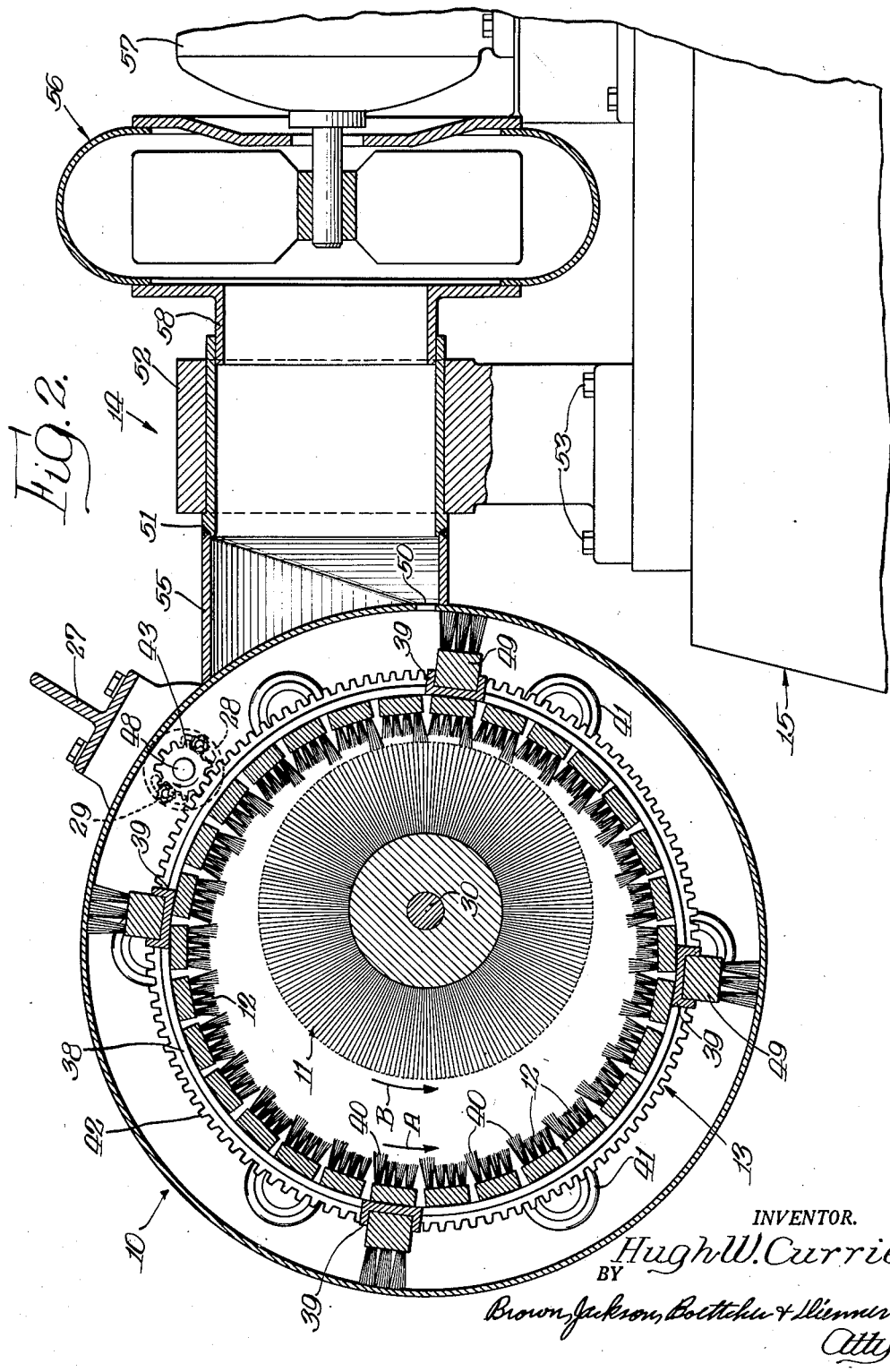

Patented Mar. 25, 1952

2,590,381

UNITED STATES PATENT OFFICE 2,590,381

CANDY CLEANING MACHINE

Hugh W. Currie, Skokie, Ill., assignor to Currie Manufacturing Company, Chicago, Ill., a corporation of Illinois Application November 5, 1949, Serial No. 125,685

18 Claims. (Cl. 107—44)

My invention is primarily concerned with a new, improved and useful machine for removing a coating of powdered material from molded candies or the like.

In the candy industry many candies are molded in cavities or molds formed in a bed of starch or other similar finely divided material carried in suitable trays. After the candy has set and hardened in the molds, the trays are dumped in a suitable machine, commonly termed a "mogul," where the molded candies and the loose starch are suitably separated. However, after discharge of the candies from the "mogul" there still remains a fine coating of starch on the candies which should be removed. A common practice in the industry is to remove this starch coating by hand brushing, which is a laborious task. My invention accomplishes the removal of this fine coating of starch, or like molding material, by means of a single cleaning device affording a continuous starch removal and candy cleaning operation.

Briefly, my invention comprises a specially adapted drum tumbler fitted with a system of internal rotating brushes for brushing the starch from the tumbling candy and vacuum means for removing and collecting the dislodged starch from the tumbler drum. It is a primary object of my invention to present a new and improved candy cleaning machine which will efficiently remove starch, or like powdered material, from candies without causing deformation or crushing of the candies.

It is a further object of my invention to provide a candy cleaning machine having a candy brushing system capable of adjustment, so that the machine is adaptable for candies of various sizes and hardnesses.

A further object of my invention is to provide a machine for removing a starch coating from candies in which the starch is carried away from the machine by vacuum means and conveniently collected in a depository for reclamation thereof.

A still further object of my invention is to provide a novel and simple device for insuring complete removal of the starch from the interior of the machine, whereby the machine is kept substantially free of internal starch deposits.

These and other objects will appear from time to time as the following description and specification proceed. Now, in order to acquaint those familiar with the art as to the mode of constructing and utilizing my invention, I shall describe a preferred embodiment thereof which will be readily more understandable with reference to the accompanying drawings wherein:

Figure 1 is a lengthwise, central, vertical, sectional view of a machine embodying my invention, certain parts being shown in elevation;

Figure 2 is a transverse, enlarged, vertical, sectional view taken substantially on line 2—2 of Figure 1, certain parts being partly broken away and shown in section, and certain other parts being shown in elevation;

Figure 3 is an end view of the machine of Figure 1, as seen from the charging end; and Figure 4 is a plan view of the machine of Figure 1, partly broken away and shown in section.

Referring now to Figures 1 and 2, of the drawings, the machine shown therein comprises, generally, a stationary cylindrical inclined tumbler drum 10, containing a candy brushing assembly comprising a rotatable, central, adjustable brush 11 surrounded by a plurality of circumferentially disposed, rectangular brushes 12 mounted on a cylindrical supporting structure 13; the drum 10 being supported by a suitable trunnion structure 14 which, in turn, is rigidly secured to a supporting base or pedestal 15, and the brushes rotatably driven by a main drive motor 16.

The charging end of the drum 10 is partially closed by a metal head plate 20 in the form of a ring defining a large, diametered, circular, center opening 21 and removably fastened to the charging end of the drum by stud bolts 22. A receiving hopper 23 is mounted on the annular head plate 20 and the opening 21 thereof, so as to extend into the drum 10 and protrude outwardly from the charging end of the machine to receive candy from a "mogul" or similar source. The discharge end of the machine is similarly provided with a ring 24 fastened to the drum by bolts 22 and defining an opening 25 in which a discharge chute 26 is mounted.

Referring to Figure 1 of the drawings, it will be seen that the candy brushing assembly is disposed in the interior of the drum 10 and adapted to separate the starch coating from the molded candy as it is gravitationally tumbled downwardly along the incline of the drum from the receiving hopper to the discharge chute. The central brush 11 is preferably cylindrical in shape, having brushing tufts of uniform length and secured on a central shaft 30. If desired the brush 11 may be composed of a plurality of sectional lengths 11a, 11b and 11c, as shown in Figure 1 to provide convenient means for varying the brushing pressures and the type of brushing contact on the candies as they are freed of their starch coating in the brushing structure. In many instances, it is necessary to merely polish or lightly brush the candies after the starch coating is removed in order to prevent over brushing and consequent damage to the candies. The desired effect of brushing contact is readily accomplished by varying the style and arrangement of the several sections 11a, 11b and 11c, as desired. Further it should be noted that the brush section 11a at the initial charging stage is provided with a tapering tuft effect at its outer end to prevent piling up of the candy at the charging stage and ready distribution thereof about the brushing structure without undue breakage of the candy. The shaft 30 extends through the central openings of the head and cover plates and is rotatably mounted at the charging end of the machine in a suitable bearing member 31 carried by an arm 32 pivotally connected intermediate its upper end, to the head plate 20 by a pivot bolt 33 for pivotal adjustable movement thereabout. A block 34, formed integrally with arm 32, is disposed at the upper end thereof and connected to a T rail 27 by suitable bolts or the like. The shaft 30 is rotatably mounted, at the discharge end of the drum, in a tubular bearing post 35 carried by and secured to a gear housing 36 which is pivotally connected at its upper end to the cover plate 24 by means of a hollow pivot post 37. The upper end of gear housing 36 is cross connected with arm 32 by the T rail 27. Thus, it is seen that the shaft 30 and attached brush 11 are mounted in a suitable manner for simultaneous arcuate movement about the two pivot members 33 and 37. The inner end of the post 37 has a flange 28 with slotted arcuate openings, not shown, for receiving bolts 29 threaded into head plate 24 to provide adjustable holding means for maintaining the brush 11 in various desired positions of contacting adjustment with the rectangular brushes 12 in the interior of the drum.

The rectangular shaped brushes 12 are mounted concentrically within the interior of the drum 10 in spaced apart relation, as shown in Figure 2, on the cylindrical supporting structure 13. The supporting structure 13 comprises a pair of annular end frames 38 held in parallel spaced apart relation by a plurality of channel bars 39 bolted thereto. The brushes 12 are suitably clamped to the inside of the end frames, so that their bristles extend radially toward the central longitudinal axis of the drum 10 when mounted within the drum on the end frames 38. Each brush 12 is provided with a tier of extra long bristles 40 disposed along one edge thereof to aid in maintaining the candy in contact with the central brush 11, and to keep the candies well dispersed around the cylindrical brushing structure comprising the brushes 12. Each of the end frames 38 is rotatably mounted concentrically with the drum 10 by a plurality of shouldered rollers 41 mounted on the head and cover plates 20 and 24, respectively of the drum. One of the end frames has secured thereto a ring gear 42 meshing with a pinion 43 driven by belt and pulley means 44 from the main drive motor 16 mounted on the extension of the T rail 27 at the discharge end of the drum. Both the central brush 11 and the brush structure 13 are rotated in the same direction, as indicated by arrows "A" and "B" in Figure 2, through the use of a conventional gear train consisting of a main driving gear 45 for rotating driven gears 46 and 47, all housed in the gear housing 36. Gear 46 is mounted on the end of a stub shaft 48 journalled in the hollow pivot post 37 and having the pinion mounted on its inner end, driving the ring gear 42. Gear 47 is mounted directly on the shaft 30 to which the central brush is secured. The gear train, as shown in Figure 4, is designed to rotate the central brush at a relatively higher rotational speed than the outer brushes 12 and attached supporting structure 13, rotated by means of ring gear 42 and pinion 43.

Means for maintaining the interior cylindrical walls of the drum clean and free of starch is provided, as shown herein in Figures 1 and 2, comprising a series of long rectangular wiping brushes 49 mounted on the longitudinally extending channel bars 39 secured to the two annular end frames 38. As the supporting structure 13 and brushes 12 are rotated within the drum, the brushes 49 engage the inner surface of the drum and sweep the starch collected thereon upward to an open slot 50 extending substantially the length of the drum 10, where the starch is picked up and removed from the machine through the trunnion structure, as will be explained presently.

The trunnion structure 14, as shown in Figure 2, includes a hollow cylindrical boss 51, operatively connected to the drum 10, and disposed at about the midlength and above the axis of the drum to support the latter for adjustable pivotal movement in a split bearing structure 52, rigidly secured to the pedestal 15 by bolts 53, or other suitable means. In operation, the drum may be adjusted to a desired inclined position from the horizontal and then the split bearing 52 tightened about the boss 51 by suitable bolts 54 (Figure 4) to grip firmly the boss 51 and thus maintain the drum's inclined position, so that candy will be fed along the brush structures within the drum by gravity.

A manifold 55 extending along drum 10 exteriorly thereof overlies slot 50 and opens into boss 51 and is rigidly connected, as by welding, to the boss 51 and the drum 10. A suction fan 56, driven by a motor 57, is mounted on the pedestal 15 and has its intake connected to boss 51 by neck 58 fitting into the outer end of boss 51. The fan 56 draws the starch through slot 50, manifold and boss 51, and discharges it, through outlet neck 59, into a suitable receptacle. Such a bag 60 is conveniently attached to neck 59 for receiving the discharged starch, which may later be recovered and used again.

The pedestal 15, which supports the trunnion structure 14, may be of any suitable shape and size sufficient to provide a steady support for the overhanging drum and its associated mechanisms. As shown herein in Figures 1 and 2, it is preferably of sheet metal fabricated into a rigid unit, as by welding, and having substantially a rectangular front profile and a trapezoidal cross section. For convenience, rollers or casters 61 may support the pedestal for rolling movement along the ground, although it may be more desirable in some instances to anchor the pedestal directly to the ground or flooring, in which case the rollers would be omitted.

Use and operation

In using a device such as I have described above, the candy is first introduced into the receiving hopper where it will be fed gravitationally between the rotating brushes inside of the stationary drums. Adjustment of the central brush 11, comprising sections 11a, 11b and 11c, towards and away from the rectangular brushes 12 is accomplished by loosening bolts 29 in flange 28 of the hollow pivot post 37, and swinging the brush 11, shaft 30, arm 32 and T rail 27 about the pivot members 33 and 37 to thus move the brush 11 to the desired adjusted position relative to the brushes 12. The bolts 29 may then be tightened again to maintain this contacting adjustment of the brushes, which will vary, depending on the size and hardness of the candy which is to be cleaned. It should be noted that the tiers of longer bristles 40 on the brushes 12 prevent the candy from collecting at the bottom of the drum, and also aid in maintaining the candy in contact with the central brush. As starch is removed from the candy, it falls through the spaces left between the circumferentially disposed brushes 12 and lights on the interior of the drum, or is drawn directly through the slot 50 by the suction created by the fan 56. The starch that tends to collect on the drum's interior is constantly dislodged by the wiping brushes 49 and lifted up to the slot 50, where the fan suction picks it up and deposits it in the bag 60 for later reclamation. As the candy moves down the slope of the drum to the discharge chute, it is freed of its starch coating and comes out of the machine clean and unmarred in appearance, ready for packaging or for further treatment.

Thus, it will be seen that I have disclosed a new and useful machine for cleaning a powdery coating from candy, which will not damage or crush the candy, and which collects the removed powdered material for convenient and ready reclamation and re-use.

While I have herein shown one preferred form in which my invention may appear, it will be readily understood that numerous changes, modifications and substitution of equivalents may be employed without departing from the spirit and scope of my invention and, therefore, I do not wish to be limited to the specific embodiment illustrated, except as may appear in the following appended claims.

I claim:

1. In a candy cleaning machine of the type adapted to remove a thin coating of finely divided powdered material such as starch or the like from molded candies; a hollow drum, a ground engaging pedestal, a hollow trunnion structure connecting said drum to said pedestal, a central rotatable brush structure longitudinally disposed within the hollowed interior of said drum, an annular brush structure surrounding said central brush and positioned inside said drum and disposed in concentric relation with the interior surface thereof, and driving means disposed at one end of said drum for rotatably driving said two brushing structures whereby said thin coating of powdered material may be removed from said candy being fed between and contacted by said two brushing structures.

2. In a candy cleaning machine of the type adapted to remove a thin coating of finely divided powdered material such as starch or the like from molded candies; a hollow drum, a ground engaging pedestal adjacent said drum, a hollow trunnion structure connecting said drum to said pedestal, a central rotatable brush structure longitudinally disposed within the hollowed interior of said drum, an annular brush structure surrounding said central brush and positioned inside said drum and disposed in concentric relation with the interior surface thereof, and driving means for rotatably driving said two brushing structures in the same rotational direction and for maintaining a differential of rotational velocity therebetween.

3. In a candy cleaning machine adapted to remove powdered starch or like substance from molded candies, a stationary drum structure, candy receiving means disposed at one end of said drum, a discharge chute disposed at the other end of said drum, a hollow trunnion communicating with the interior of said drum and extending laterally outward from one side thereof, a ground engaging supporting base adjacent said trunnion and therebelow, adjustable clamping means mounted on said base and rotatably journalling said trunnion, said clamping means serving to lock said trunnion against rotation as selected for maintaining said drum in various inclined positions with reference to the horizontal, a circumferentially disposed brushing assembly rotatably mounted within said drum's interior, a rotatable central brush disposed within the circumferential boundaries of said brushing assembly in bristle contacting relation therewith, said drum having a slot extending substantially the full length thereof communicating with said trunnion, and means disposed at the opposite end of said hollow trunnion from said drum for sucking said starch removed from said candy through said slotted opening and away from said drum.

4. In a candy cleaning machine adapted to remove powdered starch or the like from molded candies, a cylindrical drum structure, a hollow trunnion structure mounted on one side of said drum and projecting laterally outwardly therefrom, a supporting pedestal mounted below said trunnion, split bearing means interconnecting said base and said trunnion and journalling the latter for rotational movement therein, said bearing means being lockingly engageable with said trunnion with a clamping action to selectively prevent rotational movement thereof whereby said drum may be locked in an inclined position as selected, a rotatably driven cylindrical central brush mounted for adjustable arcuate movement along the longitudinal interior of said drum, a pair of annular end frame members rotatably mounted in concentric relation with the interior surface of said drum, interconnecting bar members rigidly securing said end frames together in parallel relation with one another, a plurality of rectangular brushes mounted to the inside of said annular frames and reaching therebetween, a plurality of wiping brushes mounted between said end frames and the inside surface of said drum and having their bristles in wiping contact with said drum's interior surface, said drum having a slot extending substantially the full length thereof and communicating with said trunnion, said end frames with attached brushes being rotatably driven inside said drum whereby said wiping brushes will maintain said drum's interior surface substantially free of said starch and will move said starch to said slot, and vacuum means communicating with the interior of said drum through said slot and trunnion for removing said starch from said drum and discharging the same exteriorly thereof.

5. In a candy cleaning machine for removing powdered material, such as finely divided starch or the like, from molded candies; a stationary cylindrical drum adapted to be mounted in an inclined position for causing said candies to be fed along its sloping interior by force of gravity, an annular plate mounted over each end of said drum, a hollow cylindrical boss projecting from the side wall of said drum, a manifold extending laterally from said boss to said side wall of said drum and secured longitudinally therealong, said drum having a lengthwise slot opening into said manifold, a fixed split bearing structure receiving said boss movable into and out of clamping engagement therewith to solidly grip and release said boss whereby said boss and attached drum may be rotatably adjusted to position said drum in a suitable inclined position, suction fan means having its intake connected to said boss, and a plurality of wiping brushes rotatably mounted in the interior of said drum and adapted to wipe the interior cylindrical surface of said drum to bring said starch removed from said candy into proximity with said slot so that said fan may suck said starch out of said drum and deposit same in a suitable collecting receptacle.

6. A candy cleaning machine comprising, a cylindrical drum, a hollow boss projecting from the side wall of said drum, split bearing means rotatably journalling said boss, adjustable gripping means interconnecting said bearings and adapted to lock or release said boss for rotation in said bearings whereby said drum selectively may be positioned at various inclines, a cylindrical brush supporting structure rotatably mounted within said drum, a plurality of rectangular brushes mounted in spaced parallel relation on the interior of said supporting structure, a plurality of wiping brushes disposed on the outside of said supporting structure in wiping contact with the interior cylindrical walls of said drum, a central cylindrical brush mounted inwardly from the peripheral limits of said brush supporting structure and said rectangular brushes mounted thereon, driving means for rotatably driving said brush supporting structure with its associated brushes and said central cylindrical brush at unequal rotational speeds, candy receiving means disposed at the upper end of said drum, and candy discharging means disposed at the lower end of said drum, whereby said candy will gravitationally feed itself along said drum's incline between said rotating rectangular brushes on said annular brush supporting structure and said centrally disposed cylindrical brush so that said coacting brushes may remove a coating of powdered starch or like material from said candy, said wiping brushes simultaneously acting to wipe said drum's interior surface free of said starch so removed from said candy.

7. A candy cleaning machine comprising a cylindrical drum, hollow trunnion means connected to said drum and to a supporting base, adjusting means connecting said trunnion to said drum whereby the latter may be positioned at a suitable operating incline, an annular plate mounted on each end of said drum, a plurality of rollers positioned in the interior of said drum on each of said annular plates, a cylindrical brush supporting structure mounted for rotational movement on said rollers and positioned in concentric relation with said drum, a plurality of rectangularly shaped brushes having a tier of long bristles and a plurality of shorter bristled tiers mounted within said brush supporting structure, said rectangular brushes being positioned so that their bristles are directed radially inward toward the axis of said drum, a single cylindrical brush disposed inwardly toward said drum's central interior from said rectangular brushes in bristle contacting relation therewith, and regulatory means for pivotally mounting said cylindrical brush on said drum whereby it may be adjustably moved in an arcuate path toward or away from said plurality of rectangularly shaped brushes to thereby regulate the contact intensity of said central and rectangular brushes on said candy as it is gravitationally fed therebetween along said drum's operational incline.

8. In a candy cleaning machine adapted to remove a coating of powdered material such as starch or the like from molded candies, an inclined cylindrical drum having substantially open ends, an annular brush structure comprising a series of brushes disposed in concentric relation with said drum, each of said brushes having at least one tier of bristles of greater length than its others, a centrally disposed cylindrical brush rotatably mounted within said annularly disposed brush structure inside of said drum pivotal means supporting said cylindrical brush for arcuate movement toward or away from said annular brush structure thereby to regulate the brushing contact with said candy being gravitationally fed between said annular brush structure and said cylindrical brush, said longer tiers of bristles in said annular brush structure adapted to keep said candy in cleaning contact with said brushes and to prevent a collection of said candy along the bottom cylindrical interior of said annular brush structure, and driving means operatively connected with said central brush and said annular brush structure for simultaneously supplying rotational movement thereto whereby said candy will be cleaned of said starch by said brushing action as it passes between said brushes.

9. In a candy cleaning machine adapted to remove a coating of finely divided material such as starch or the like from candies, an inclined cylindrical drum, mounting means comprising a hollow trunnion secured to said drum extending laterally therefrom and adjustable about its axis for rotatable movement to hold said drum in a desired inclined position, a candy brushing structure rotatably mounted within said drum, a central cylindrical brush surrounded by a plurality of rectangularly shaped brushes disposed in annular spaced relation on a cylindrical supporting structure, driving means comprising a driving motor operatively connected with a suitable gear train for rotatably driving said brushing structure within said drum, said central brush being rotated at a higher velocity and in the same direction as said annularly disposed rectangular brushes; and starch removal means associated with said drum comprising a plurality of drum wiping brushes disposed on said cylindrical supporting structure in surface contacting relation with the wall of said drum, the latter having a lengthwise slot, said wiping brushes being effective for conveying removed starch to said slot, and vacuum cleaning means associated with said slot and said hollow trunnion means for sucking said starch through said slot and trunnion and carrying it away from said drum's interior.

10. A candy cleaning machine for removing molding starch or like powdered material from candies by suitable brushing action, comprising an inclined cylindrical drum having a suitable candy brushing structure disposed therein in which said candy is gravitationally fed between a rotating annular brushing structure and a centrally disposed cylindrical brush rotatably driven in the same directional sense as but at a higher rotational velocity than said annular brushing structure, said annular brushing structure having a plurality of long and short bristled tiers acting to hold said candy between said brushing structure and said cylindrical brush during the brushing thereof, suction fan means communicating with the interior of said drum through a slotted opening in the cylindrical wall thereof for removing said starch, brushed off of said candy, from said drum and depositing the same in a suitable receptacle outside of said drum for future reclamation thereof; and arcuately adjustable pivot arm means mounting said central cylindrical brush for arcuate movement within said drum to regulate the brushing contact pressure and the volume of the candy receiving space between said annular brushing structure and said central brush whereby said candy may be cleaned of said starch coating without marking or deformation thereof no matter what the size or hardness of said candy may be.

11. In a candy cleaning machine, a drum, a substantially cylindrical brush assembly rotatably mounted in said drum comprising cleaning brushes having bristles directed radially inward of said assembly, a rotatably mounted inner cleaning brush extending through said assembly and having bristles opposed to the bristles of the brushes of said assembly, means for supporting said inner brush in eccentric relation to said assembly and adjusting it toward and away from the latter, and means for driving said assembly and said inner brush.

12. In a candy cleaning machine, a drum, a substantially cylindrical brush assembly rotatably mounted in said drum comprising cleaning brushes having bristles directed radially inward of said assembly, a rotatably mounted inner cleaning brush extending through said assembly and having bristles opposed to the bristles of the bristles of said assembly, means for supporting said inner brush in eccentric relation to said assembly and adjusting it toward and away from the latter, and means for driving said assembly and said inner brush in the same direction and at different speeds.

13. In a candy cleaning machine, a drum inclined lengthwise, a substantially cylindrical brush assembly rotatably mounted in said drum comprising cleaning brushes having bristles directed radially inward of said assembly, a rotatably mounted cleaning brush extending through said assembly and having bristles opposed to the bristles of the brushes of said assembly, means for supporting said inner brush in eccentric relation to said assembly and adjusting it toward and away from the latter, means for driving said assembly and said inner brush in the same direction and at different speeds, and suction means for withdrawing removed starch from said drum comprising means for adjusting the extent of inclination of the latter.

14. In a candy cleaning machine, a drum inclined lengthwise and provided with a lengthwise slot spaced above its bottom, a substantially cylindrical brush assembly rotatably mounted in said drum comprising cleaning brushes having bristles directed radially inward of said assembly, wiping brushes on said assembly having bristles disposed to move removed starch from the lower portion of said drum upward to said slot, a rotatably mounted inner cleaning brush extending through said assembly eccentric thereto having bristles opposed to the bristles of the cleaning brushes of said assembly, the bristles of said inner brush being in close proximity to the bristles of the cleaning brushes of said assembly at one side thereof and remote therefrom at the opposite side, means for driving said brush assembly and said inner brush in the same direction and at different speeds, and suction means having its intake communicating with said slot.

15. In a candy cleaning machine, a drum, a substantially cylindrical brush assembly rotatably mounted in said drum comprising a plurality of cleaning brushes having bristles directed radially inwardly of said assembly, a rotatably mounted inner cleaning brush structure, comprising a plurality of sectional brush lengths of varying brushing characteristics, extending through said assembly and having the bristles of said sectional brushes opposed to the bristles of said brushes of said assembly; means for supporting said inner brush structure eccentrically in relation to said assembly for adjusting it toward and away from said assembly, and means for rotatably driving said assembly and said inner brush structure.

16. In a candy cleaning machine, a drum, a substantially cylindrical brush assembly rotatably mounted in said drum comprising a plurality of cleaning brushes having bristles directed radially inwardly of said assembly, a rotatably mounted inner cleaning brush structure, comprising a plurality of sectional brush lengths mounted to a common central shaft, said sectional lengths having unlike brushing characteristics to thereby vary the brushing effect of said structure from a rough brushing at the charging end of said drum to a polish brushing at the discharge end of said drum, said inner structure extending along the cylindrical interior of said assembly with the bristles of said sectional brush lengths opposed to the bristles of said assembly brushes; adjustable means for mounting said inner structure in eccentric relation to said assembly for adjustable movement toward or away from said assembly to thereby vary the contacting pressure between said opposed bristles of said brush structure and assembly, and means for rotatably driving said structure in the same rotational direction but with a velocity differential therebetween.

17. In a candy cleaning machine, a drum, annular end plates closing over the ends of said drum, said end plates having central apertures formed therein for providing candy charging and discharging access to said drum's hollow interior, a substantially cylindrical brush assembly rotatably mounted concentrically within said drum, a central brush structure rotatably mounted within said brush assembly in nonconcentric relation thereto on a shaft extending the length of said drum and protruding through said two apertures formed in said end plates of said drum, the end of said brush structure adjacent said charging end of said drum being substantially conical in shape to provide gradual brushing contact with said candy being charged into said drum whereby said candy will be distributed evenly between said central brush structure and said surrounding brush assembly.

18. A candy cleaning machine, a cylindrical drum, a receiving hopper at one end of said drum for charging candy into said drum's interior, a substantially cylindrical brush assembly rotatably mounted concentrically within said drum's interior, an inner brush structure rotatably mounted in non-concentric relation to said drum within said brush assembly, and a substantially conical shaped end on said inner brush structure adjacent said receiving hopper disposed within said drum's interior adapted to receive said candy from said hopper and evenly distribute said candy between said inner brush structure and said cylindrical surrounding brush assembly to cause a gradual feeding of said candy along and between said brush structure and cylindrical brush assembly.

HUGH W. CURRIE.

REFERENCES CITED

The following references are of record in the file of this patent:

UNITED STATES PATENTS

| Number | Name | Date |
| --- | --- | --- |
| 188,776 | Butger | Mar. 27, 1877 |
| 527,590 | Carlson | Oct. 16, 1894 |
| 593,325 | Heine et al. | Nov. 9, 1897 |
| 630,336 | Foster | Aug. 8, 1899 |
| 813,626 | Draudt | Feb. 27, 1906 |
| 2,018,418 | Rapisarda | Oct. 22, 1935 |